(12) United States Patent
Vilvovsky (10) Patent No.: US 10,693,660 B2
(45) Date of Patent: Jun. 23, 2020

(54) METHOD AND SYSTEM FOR SECURE DATA STORAGE EXCHANGE, PROCESSING, AND ACCESS

(71) Applicant: Serge Vilvovsky, Belmont, MA (US)

(72) Inventor: Serge Vilvovsky, Belmont, MA (US)

( * ) Notice: Subject to any disclaimer, the term of this patent is extended or adjusted under 35 U.S.C. 154(b) by 306 days.

(21) Appl. No.: 15/796,359

(22) Filed: Oct. 27, 2017

(65) Prior Publication Data

US 2018/0191506 A1 Jul. 5, 2018

Related U.S. Application Data

(60) Provisional application No. 62/442,535, filed on Jan. 5, 2017.

(51) Int. Cl.
| | |
|---|---|
| *H04L 9/32* | (2006.01) |
| *G06F 21/60* | (2013.01) |
| *H04L 29/06* | (2006.01) |
| *H04L 9/14* | (2006.01) |
| *H04L 9/08* | (2006.01) |
| *G06F 21/62* | (2013.01) |
| *G06F 11/14* | (2006.01) |

(52) U.S. Cl.
CPC .......... *H04L 9/3247* (2013.01); *G06F 21/602* (2013.01); *G06F 21/6227* (2013.01); *H04L 9/0891* (2013.01); *H04L 9/0894* (2013.01); *H04L 9/14* (2013.01); *H04L 63/101* (2013.01); *G06F 11/1469* (2013.01)

(58) Field of Classification Search
CPC ....... H04L 9/3247; H04L 9/14; H04L 9/0891; H04L 9/0894; H04L 63/101; G06F 21/602; G06F 21/6227; G06F 11/1469

USPC .................................................. 713/176
See application file for complete search history.

(56) References Cited

U.S. PATENT DOCUMENTS

| | | | | |
|---|---|---|---|---|
| 6,229,894 | B1 * | 5/2001 | Van Oorschot | ..... G06F 21/6209 709/229 |
| 6,915,433 | B1 * | 7/2005 | Barber | ...................... H04L 9/32 713/176 |
| 7,047,241 | B1 * | 5/2006 | Erickson | .................. G06F 21/10 |
| 7,865,741 | B1 * | 1/2011 | Wood | .................... G06F 21/606 380/277 |
| 8,116,455 | B1 * | 2/2012 | Sussland | ............... G06F 21/575 380/277 |
| 8,316,461 | B2 | 11/2012 | Chang et al. | |
| 8,607,046 | B1 * | 12/2013 | Silberman | ............. H04L 9/3228 713/168 |
| 9,525,692 | B2 | 12/2016 | Gaudet et al. | |

(Continued)

OTHER PUBLICATIONS

Dourish, Paul, et al. "Extending document management systems with user-specific active properties." ACM Transactions on Information Systems (TOIS) 18.2 (2000): 140-170. (Year: 2000).*

(Continued)

*Primary Examiner* — Syed A Zaidi
(74) *Attorney, Agent, or Firm* — Richard A. Baker, Jr.

(57) ABSTRACT

A multi-user encrypted secure data storage schema is described that is particularly suited for cloud based storage scenarios. This schema protects against an insider attacks be limiting administrator access to encrypted user data. The schema involves encrypting both the data set and user catalogs, where the catalogs contain data locations and data keys in metadata objects. The metadata objects may be share between users to provide others access to the data.

19 Claims, 7 Drawing Sheets

(56) References Cited

U.S. PATENT DOCUMENTS

| | | | |
|---|---|---|---|
| 2003/0074356 A1* | 4/2003 | Kaler | G06F 21/6218 |
| 2003/0105718 A1* | 6/2003 | Hurtado | G06F 21/10 |
| | | | 705/51 |
| 2004/0123109 A1* | 6/2004 | Choi | H04N 21/8456 |
| | | | 713/176 |
| 2005/0052685 A1* | 3/2005 | Herf | H04L 29/06 |
| | | | 358/1.15 |
| 2006/0080316 A1* | 4/2006 | Gilmore | G06F 21/6209 |
| 2006/0272026 A1* | 11/2006 | Niwano | G06F 21/10 |
| | | | 726/27 |
| 2008/0141334 A1* | 6/2008 | Wicker | G06F 17/50 |
| | | | 726/1 |
| 2008/0270461 A1* | 10/2008 | Gordon | G06F 3/0608 |
| 2010/0146287 A1* | 6/2010 | Kreiner | H04L 63/12 |
| | | | 713/178 |
| 2010/0154054 A1* | 6/2010 | Beck | H04L 63/12 |
| | | | 726/21 |
| 2011/0289309 A1* | 11/2011 | Tanenbaum | H04L 9/0825 |
| | | | 713/150 |
| 2012/0310983 A1* | 12/2012 | Mittal | G06F 21/44 |
| | | | 707/785 |
| 2014/0013112 A1* | 1/2014 | Cidon | G06F 21/6218 |
| | | | 713/165 |
| 2016/0342654 A1* | 11/2016 | Bendel | G06F 16/24542 |
| 2017/0109759 A1* | 4/2017 | Korb | G06Q 30/018 |
| 2017/0249135 A1* | 8/2017 | Gandhi | G06F 8/65 |

OTHER PUBLICATIONS

NPL Search Results (Year: 2020).*
"AWS Key Management Service Developer Guide", Amazon Web Services, 2017.

* cited by examiner

METHOD AND SYSTEM FOR SECURE DATA STORAGE EXCHANGE, PROCESSING, AND ACCESS

RELATED APPLICATIONS

This patent application is a non-provisional application of, and claims the benefit of the filing dates of, U.S. Provisional Patent No. 62/442,535 filed on Jan. 5, 2017 entitled A METHOD AND SYSTEM FOR SECURE DATA STORAGE AND EXCHANGE. The disclosures of this provisional patent application is incorporated herein by reference.

BACKGROUND

Technical Field

The devices described herein are directed to computer security, and more specifically to multi-user, cloud based or private data center secure data storage, exchange and processing.

Description of the Related Art

In recent years, the trend in computing has been towards cloud computing, moving data and processing to centralized servers in remote locations on the Internet. This allows users to store and share large volumes of data with colleagues in disparate geographical locations. Various vendors provide cloud computing services, for instance Amazon provides the Amazon Web Services (AWS) suite of tools and services to allow users to manage their data on Amazon sites. Similarly, Microsoft offers the Azure Cloud Computing Platforms and Services.

With the move to cloud computing, the need for data security became acute, as users could no longer locally protect data through physical and firewall protection mechanisms. As a result, the computing industry turned to encryption to block unauthorized access to data. For instance, Amazon AWS uses client side encryption using AES encryption, where the data is encrypted on the user's computer before it is transmitted over the internet to the AWS cloud storage. Amazon AWS and Microsoft Azure both offers server-side encryption.

Figure 2:
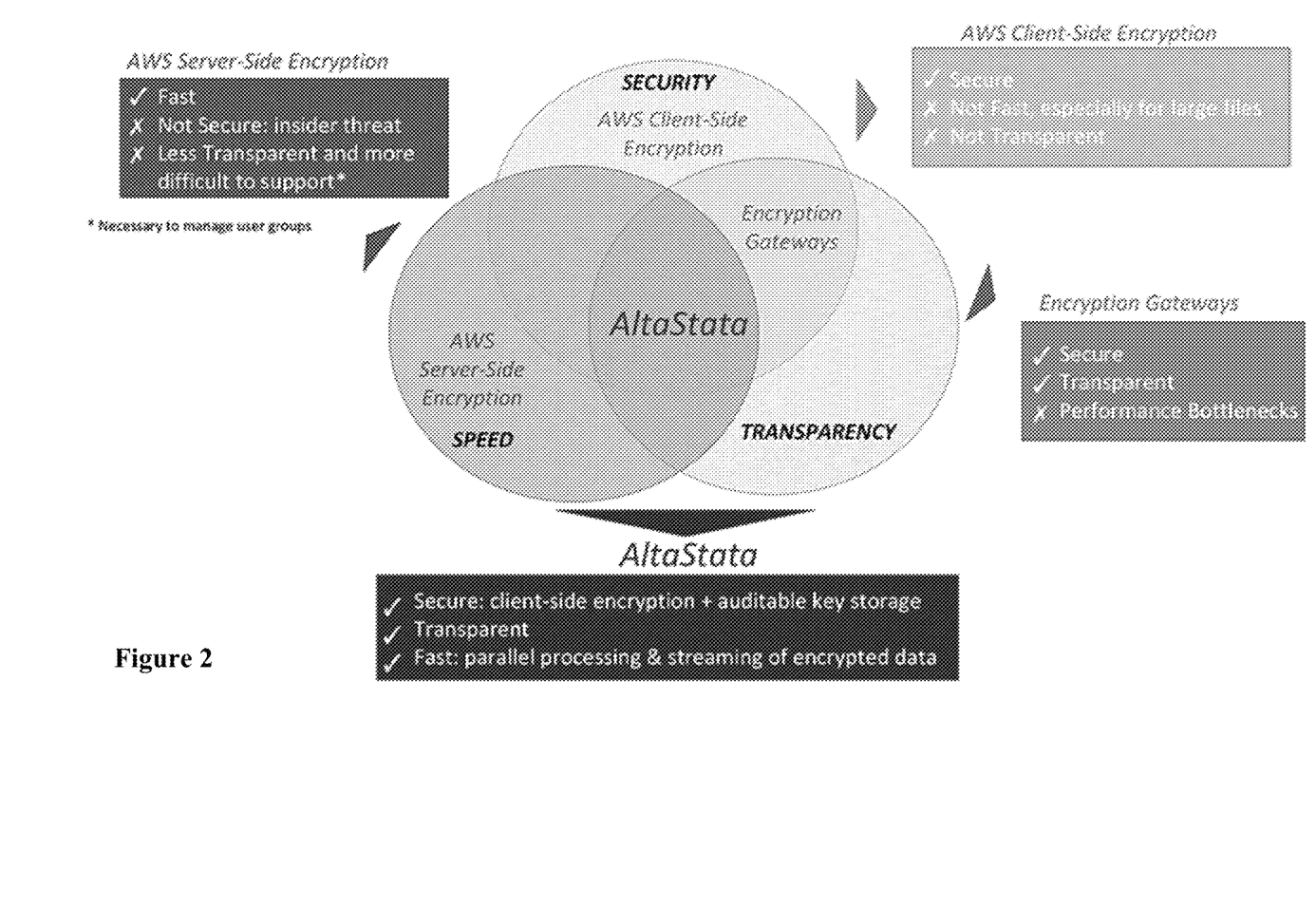
FIG. 2 shows the three categories of existing solutions: Server-Side encryption, Client-Side encryption and Encryption Gateways.

Looking to FIG. 2, there are three categories of existing solutions: Server-Side encryption, Client-Side encryption and Encryption Gateways.

AWS Server-side encryption does not provide transparent security since it requires supporting user groups and roles polices, which is burdensome for the IT department. Users need to be trained for security policies and can easily make mistakes, which will compromise the organization's or customers' data and violate compliances. The cloud account system administrator access privileges become insider threat, as he is able to access and modify any file.

AWS Client-side encryption is not transparent, since it requires supporting data key storage, which AWS does not provide. It also slows down the time of upload and processing for the large files as the encryption/decryption phase takes significant time.

Secure (or Encryption) gateways that run on premises or on cloud instance machine restrict cloud scalability and create bottlenecks for Big Data parallel processing, as all data needs to flow through them.

With server-side encryption, the organization's users must trust the organization's system administrator. If the system administrator decides to access a user's data, the user can not prevent this unauthorized access. This is one type of insider threat. Another type of insider threat comes from users who are authorized to access the data, but do so in unauthorized ways. To manage insider threats on a server-side encryption scheme, the data system needs to be designed with strict separation of duties for users, resulting in a large and difficult to maintain user access system.

With client-side encryption, insider attacks can be prevented because each user/client computer performs its own encryption, thus controlling their own data. But each key must be managed so that a failure of the client computer does not lose the key to the data. Furthermore, there is no mechanism to share the key with another user.

While the needs for data security on large data sets is particularly acute with cloud computing, the security needs of data centers is also an important issue in computing today.

The present invention, eliminates the issues articulated above as well as other issues with the currently known products.

SUMMARY OF THE INVENTION

An example embodiment of the invention comprises: a method of controlling access to data objects, comprising a first user creating a data object in a container that has an access control list; the first user creating a first metadata object comprising data access information for a data object; the first user creating a second metadata object comprising the data access information for the data object; wherein a second user has access to the second metadata object; wherein the second user does not have access to the first metadata object; and determining access to the data object by the data access information and the access control list.

In some embodiments, the data access information comprises a decryption key for the data object. In other embodiments, the data access information comprises location information for the data object.

In some embodiments, the first user does not have access to the second metadata object.

In some embodiments, the data access information further provides a path to a data fragment within the data object.

In some embodiments, the data object comprises multiple data fragments.

In some embodiments, the first metadata object is decryptable with a first decryption key, wherein the first user has exclusive access to the first decryption key.

In some embodiments, the second metadata object is decryptable with a second decryption key, wherein the second user has exclusive access to the second decryption key.

Some embodiments further comprise: the first user signing the first metadata object with the first signature key; the first user signing the second metadata object with the first signature key; the second user verifying that the second metadata object is signed by the first user; and the second user signing the second metadata object with the second signature key.

Some embodiments further comprise: the first user creating a recovery metadata object comprising the data access information; wherein a recovery user has access to the recovery metadata object and blocking the recovery user from accessing the data object through the access control list.

Another embodiment of the invention comprises a system for controlling access to data objects, where the system comprises a data object in a container that has an access control list, said data object owned by a first user; a first metadata object comprising data access information for the data object, said first metadata object owned by the first user; a second metadata object comprising the data access information for the data object, created by the first user; wherein a second user has access to the second metadata object; wherein the second user does not have access to the first metadata object; wherein access to the data object is determined by the data access information and the access control list.

In some embodiments the data access information of the system comprises a decryption key for the data object.

In some embodiments, the data access information in the system comprises location information for the data object.

In some embodiments the first user of the system does not have access to the second metadata object.

In some embodiments of the system, the data object is a data fragment.

In some embodiments of the system, the first metadata object is decryptable with a first decryption key, and the first user has exclusive access to the first decryption key.

In some embodiments of the system, the second metadata object is decryptable with a second decryption key, and the second user has exclusive access to the second decryption key.

In some embodiments of the system, the first metadata object is signed by the first user with the first signature key; the second metadata object is signed by the first user with the first signature key; and the second metadata object is verified by the second user that the second metadata object is signed by the first user.

In some embodiments, a recovery metadata object of the system comprising the data access information for the data object, where the recovery metadata object created by said first user; wherein a recovery user has access to the recovery metadata object; and the recovery user is blocked from accessing the data object through the access control list.

BRIEF DESCRIPTION OF FIGURES

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

In one aspect of the invention provides fast, secure, and easy to manage solution to computing security on a cloud or non-cloud based system. This solution protects files, video streams, databases, message buses and other data stores from external and insider threats using techniques to enhance performance.

The Solution Benefits

The client-side solution is applicable for public clouds (such as AWS or Azure) or private data centers/clouds. It creates transparent security for users and programs, allowing them to focus on their workload, and not on how security is implemented. Using this method, the organization prevents human mistakes by users unknowingly violating security policies. The organization's internal team members, programs, partners and customers are provided safe, fast and auditable sharing of sensitive information by utilizing up to three layers of security (encryption, ACL, optionally hiding actual data location). The solution allows organizations to adhere to compliance standards, such as HIPAA or PCI.

With this solution, the recovery user, which has metadata object copies for all data, shares the metadata objects in the situations when user's data audit is needed, and when the user has lost his or her private key. The recovery user does not have access to the users' data containers and cannot view or modify data, thus preventing the recovery user from accessing the data.

The method can secure file systems as well as message buses, SQL and no-SQL databases, video streams and other data stores.

The method allows fast parallel processing and streaming of encrypted data for analysis and exchange between computers and IoT devices without client or cloud machines' local file systems being involved. It ensures fast parallel processing of stored encrypted large files in Big Data environments like Spark or Hadoop.

When data files are chunked and fragments are handled in parallel, the time required for upload and download grows linearly with file size on AWS storage, while using AWS Portal it grows exponentially. At the filing date, the encryption and upload of 700 Mb file using one embodiment of the present invention takes 1 minute 39 seconds, while for AWS Web Portal only the upload takes 2 minute 50 seconds, which is 70% longer.

The method simplifies user access control and prevents insider threat by system administrator. No unencrypted data is uploaded from team members' computers and devices to the public cloud using the solution. Data owners choose users with whom the data is shared. Organization's public cloud administrator, who works through public cloud Web Portal, is able to see the object names in the users' catalogs (unless they are encrypted) and control user access to data by deleting metadata objects from their catalog containers. Administrator also can see with whom users shared metadata objects. However, the administrator is not able to view or modify data or metadata content.

Implementation

In one embodiment, an application programming interface (API) client library is provided to integrate with client-side applications and services. In another embodiment the API client library is integrated with applications and services running on cloud machines. This API client library provides encryption and decryption of data stored on the cloud (or data center or locally). The encryption extends beyond the data to the metadata associated with the data, metadata object names, data properties objects.

There are two levels of protection for the data. One level is through encryption of metadata object that contains the key to decrypt the data set and the data location within the data container or directory. The second level is through an access control list (ACL), typically built into the file system to control who can access a data container or directory. In a UNIX file system, the ACL has three types of users, owner, group, and others. Each type is allowed or not allowed to read, write or execute the file or directory. In one embodiment of this invention, the combination of ACLs and encryption is used to give some users access to keys and data locations and other users access to the data containers. For instance, an organization's cloud account system administrator needs to list and delete all metadata objects within users' catalogs, but has no need to access the data, so the system administrator has no keys for decryption and the information about the data location. A recovery user has no data container system access, but holds all of the metadata objects so that he can recover a metadata objects by sharing it with the user when a user's Private key is lost.

Figure 1:
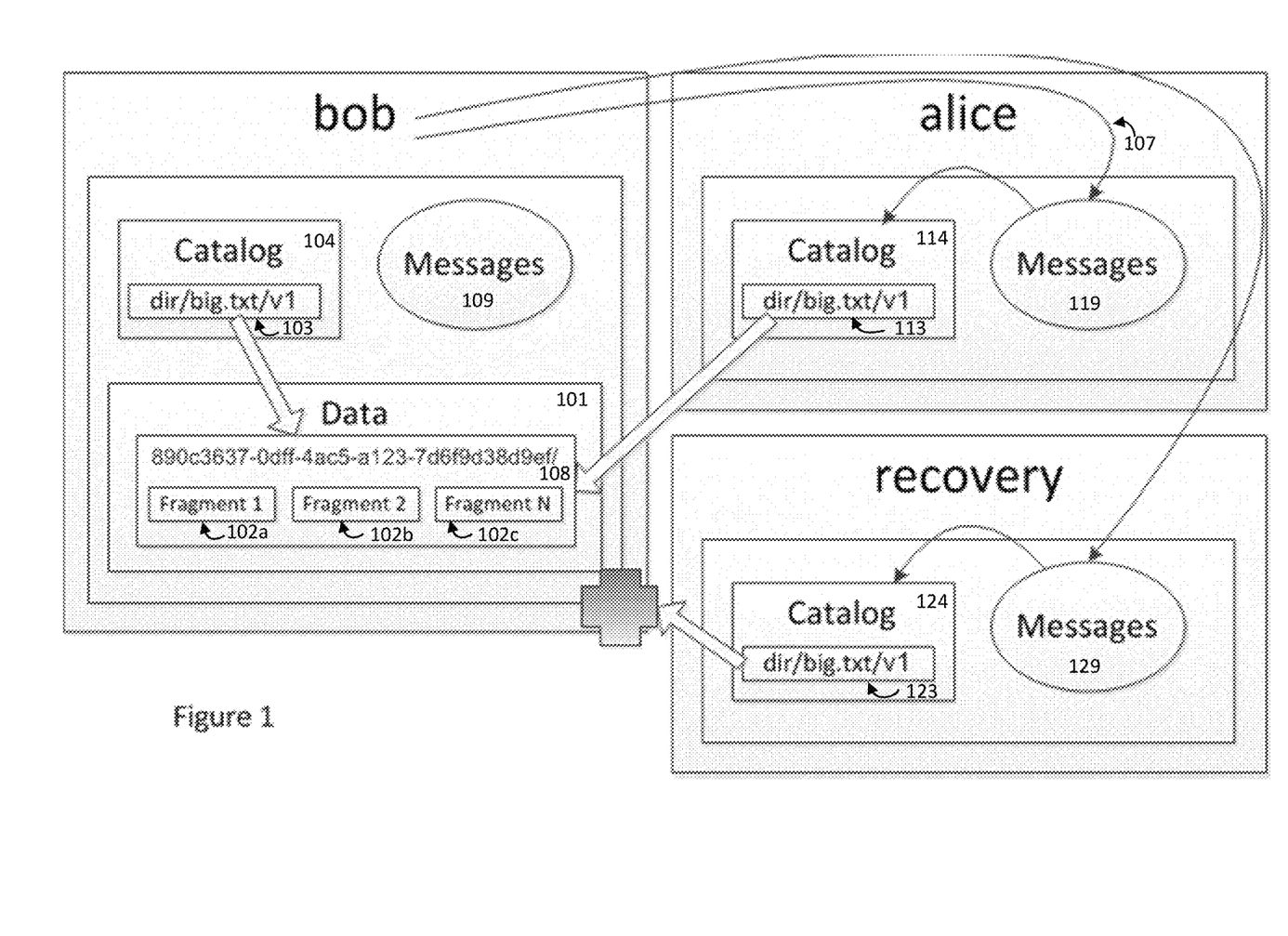
FIG. 1 shows an embodiment of the present invention.

In the embodiment shown in FIG. 1, user Bob has been created by a system administrator with a catalog 104, a messages container 109 and data container 101. Each user, when created, has a catalog, a messages container, and a data container. Alice's data container is not show in FIG. 1, but her catalog 114 and message container 119 are shown. The recovery user only has a copy of each data properties object in his data container, but he does not have his own data. The ACL is setup as seen in Table 1 below. Each user's catalog 104, 114, 124 contains metadata objects 103, 113, 123 that are encrypted with the catalog owner user's public key or HSM (Hardware Security Module) key. In one embodiment, the catalog 104, messages container 109 and data container 101 could be on different servers on the cloud or different data centers. In another embodiment, the users could be on different servers. Or the users and containers could be in any combination of locations.

In FIG. 1, Bob's file is split into N fragments 102a, 102b, 102c and the fragments are placed in the data container 101 under location 108. The fragments are encrypted using a unique symmetric data key per file version (for example AES-256). A metadata object 103 is created in Bob's catalog container and encrypted using Bob's public key or HSM key. The metadata object contains the data location and the data key, as well as other information (such as a reference to data properties object). Note that Bob may create or utilize any number of locations 108 each containing any number of data fragments 102a, 102b, 102c.

If Bob wants to share the data under location 108 with Alice, he makes a copy of the metadata object 103, signed by Bob and encrypted for Alice with Alice's public key or HSM key. This new message object 107 "msgqueue/00001502644149123/SHARE/bob/dir/big.txt/v1" is placed in Alice's messages container 119.

Alice then sees the message from Bob 107 in her messages container 119, and Alice may accept the message. At this point, the metadata in the message 107 is converted to a metadata object 113 "dir/big.txt/v1" in Alice's catalog container 114. This metadata object 113 is encrypted by Alice with her public key or HSM key and signed by Alice with her private key or HSM key. If Alice does not accept the message, the message object 107 is deleted.

Each file version owner also creates and maintains in his data container data properties object, for example "info/49c01246-a2c1-4079-8654-a295cbcf8b04". Each metadata object for the file version in different user's catalogs contains the path to data properties object. Data properties object contains file version length, list of readers and other properties. In some embodiments data properties object is encrypted using data key.

If Alice modifies the file, a new version of the data is created in Alice's data container (not shown) with the modifications under the different generated location name. A new metadata object "dir/big.txt/v2" is created in Alice's catalog 114. If Alice wants to share her modifications with Bob, a copy of the new metadata object "msgqueue/00001502644167566/SHARE/alice/dir/big.txt/v2" is placed to Bob's message container 109 containing the location of the new data and the data key for the new file, as well as new data properties object in Alice's data container.

The user can also create the other message objects and place them to users' message containers 109,119,129, for example DELETE_FILE, ADD_NEW_USER_TO_FILE, REMOVE_USER_ACCESS_FROM_FILE, etc.

Upon receiving the DELETE_FILE message object from Bob, Bob's signature is verified and, if Bob is a data owner, the metadata object 113 is deleted from user Alice catalog container and Alice loses her access to the data. Upon receiving ADD_NEW_USER_TO_FILE, REMOVE_USER_ACCESS_FROM_FILE message objects the list of readers in the data properties object is updated by data owner.

The recovery user also keeps a catalog 124 of the metadata objects 123 that he has access to. Optionally, a recovery user maintains a separate copy of the data properties object for metadata object 123 (as recovery does not have access to any users' data containers 101) and in this case, recovery should receive the same messages ADD_NEW_USER_TO_FILE, REMOVE_USER_ACCESS_FROM_FILE to keep data properties objects synchronized.

The metadata objects 103, 113, 123 can be used to secure not only file systems, but also databases, message buses, video streams, etc. Each metadata object 103, 113, 123 contains generated data key, which can be used to secure other data storage, like database table.

Using the method above users can store and share metadata object 103,113,123 among themselves. There are two options:
  Create a fake file with size 0 just for storing a data key and use external configurations for database server IP, table name, database user/password, etc.
  Store and share database configurations as part of the metadata object or data properties object.
Solution Setup and Usage In order to setup this embodiment of the invention, during initialization stage each user creates a pair of Public/Private keys and sends the Public key to the organization's system administrator. During the initialization stage, organization's system administrator manually, or using admin tool, performs the following steps:

First, the system administrator creates Identity and Access Management (IAM) users in organization cloud account or data center storage.

Next, the administrator creates, for every IAM user, containers for the user's catalog 104, data 101, and message (recording changes) 109. The containers are also referred to as buckets, in terms of AWS, or folders/directories within the containers/buckets. The message container 109 can be implemented as a persistent auditable message queue or work in combination with the message queue provided by the public cloud (e.g. AWS SQS).

Next, the system administrator assigns an access control list (ACL) for containers above. See Table 1.

TABLE 1

| Container | Owner User | Other User | Recovery User | Administrator User |
|---|---|---|---|---|
| Catalog | list, read, write, delete | none | list | list, read, write, delete |
| Data | read, write, delete | read-only | none | list, read, write, delete |

TABLE 1-continued

| Container | Owner User | Other User | Recovery User | Administrator User |
|---|---|---|---|---|
| Changes (messages) | list, read, delete | write-only | write-only | list, read, write, delete |

Once set up, the administrator stores in every user's catalog 104,114,124 information about other users, with whom data can be shared. This information includes every other user's Public Key (or certificate) and HSM key IDs and access signatures for other user's containers if needed (this would be needed for Azure, for example). This information is encrypted with user's Public key or HSM key. Access signatures have the same access control list properties as specified in Table 1. For example, catalog altamyorg1708-catalog/bob contains encrypted object ".altastata/users/alice". Using it, user Bob is able to encrypt messages for Alice and verify her signature on her messages.

Finally, the system administrator encrypts cloud access properties using the user's Public Key and sends them to the user to establish connection to the organization cloud account as particular IAM user. In another embodiment, the administrator stores and accesses cloud account credentials using systems like HashiCorp.

Once the setup is complete, the client application (UI tool or program using client API) is able to perform one or more of the following functions.

First of all, the client application can list metadata objects 103 names within the catalog 104 (including listing by prefix) for the user. The name can include version. Large catalogs can be read in parallel using multithreading approach. Each user has an object ".altastata/catalog.ranges" in his catalog that contains the list of ranges (starting/ending metadata object names) for each thread reader. This catalog.ranges object should be periodically updated, as the catalog container changes over time.

Second, the client application can store file metadata in the user's catalog as a metadata object 103, encrypted using user's Public Key or HSM key and signed using user's Private key or HSM key. It can also maintain checkpoints for the file version upload, compress/decompress fragments 102a,102b,102c in parallel, split large files into fragments on file version upload and merge the fragments on download and/or encrypt/decrypt fragments in parallel using unique (generated per file version) symmetric data key (for example AES-256).

Third, the client application can upload fragments 102a,102b,102c in parallel to the data container. It can store all the compressed encrypted fragments, which belong to the same file version, as cloud objects under a location 108 with unique name, generated per file version, in the file owner's data container.

Fourth, the client application can use the user's Private Key or HSM key to decrypt metadata object 103 so as to have access to the file version data. The client application can use the user's Public Key or HSM key to verify the signature for metadata object 103 to detect the substitution by the attacker. It can also delete metadata object from user's catalog. In this case, user will not have access to data anymore. It can delete fragments from the user's data container.

Fifth, the client application can share metadata objects 103 with other users, signing the objects with the user's Private Key or HSM key and encrypting the objects using the other users' Public Keys or HSM keys. It can also create, receive and handle "Share", "Delete", "Add/Remove Reader" and other messages and/or read metadata objects to access the data key and file version fragments locations. The client application can read file version fragments 102a,102b, 102c from the user's data containers including in parallel and as the stream.

The client application can also append the data to the last encrypted fragment 102c and re-encrypt it using the data key or append the additional encrypted fragment together with updating the file version length for the existing data properties object. It can decrypt file fragments 102a,102b,102c using data key and merge them into a file on the local file system or program buffer. The file version owner is able to add and remove readers to the data properties object.

In some embodiments the client application encrypting metadata objects and messages names before storing and reading objects in catalog and messages containers as well as listing and decrypting the encrypted metadata objects names in catalog (optionally using the encrypted prefix).

The client application can allow the recovery user to list all metadata objects 103,113,123 names in the user's catalog 104,114,124 and share the copies of user's metadata objects with any user, if necessary. For example, if user lost his Private Key and wants to re-encrypt all the metadata objects in his catalog with a new Public Key, recovery user shares the metadata objects with him. The recovery user can also share the user's metadata object for internal organization audit.

Finally, the client application can use metadata objects 103 to secure data in message buses, sql and no-sql databases, video streams and other data stores.

Encryption/Decryption Algorithm Using RSA Public/Private Keys

There is a limitation of buffer size to be encrypted using RSA Public Key. The solution method uses the following algorithm to encrypt large buffer:
1. Generate AES key
2. Encrypt buffer using the AES key
3. Encrypt AES key using RSA public key or HSM key
4. Concatenate encrypted buffer, AES initialization vector (IV) and encrypted AES key buffers The decryption algorithm works in the opposite direction. First it decrypts the AES key using the RSA Private Key (or HSM key) and after that, decrypts the encrypted buffer using the AES key and AES IV.

Metadata Object Name Encryption Algorithm

For some organization, with restrictive security requirements, the solution method supports metadata object names encryption.

If there are two metadata objects 103 "directory1/My_dir22/file1.txt" and "directory1/My_dir22/file2.txt", then the names are encrypted in a way that the common prefix "directory1/My_dir22", in the encrypted state, is also the same.

For example, the first and second names will be:

Y9FiCBJZ1zFMOj06q69S0w/Wmh7fdHMHlgtC6Nk140Tng/y3zaIgv-
zjmT_WyOcJj93Q/caC3fKAFm4Im5-Wn4MynzraWMQMdIFEtAU2JUdVOuY22k-
leksvWQe34xtREhGM_D8KNmX0alz_byrhwChp3iioa5hJl6xASju4qZzBg-

```
uoPdEpAaood87S5H2OU8hZ0GrOcBp2FTldnxFPPJZYPO7bYVtb1LNJMTNTTQ8Ds2
WA
```
and
```
Y9FiCBJZ1zFMOj06q69S0w/Wmh7fdHMHlgtC6Nk140Tng/vofzzXMTmCp1ImSLm7
1mTg/Kj1ZQ14vd119qCgzLLWiAtw4TciAYxLRYCX5gjpWpkSDec9b7UswRXAmn1
RVgiSWdCZ1riSM_Zh8iDfQy4jW70j-dhtxXdInQtBiqOx9_4_t9zFRyP51_-
mie19OumlZxtO7B4E2Trgd6uwb3qJBKxCC5_JsETh2WPHbzFg3hsU
```

The algorithm requires that every time when a part of the metadata object name (file path separated by '/') is encrypted, it will be encrypted to the same cipher text, for example using AES encryption with the initialization vector (IV) equal to 0.

For encryption algorithm, calculate the AES Key for each file version path part ("directory1", "My_dir22", "file1.txt") as a XOR of AES Key calculated for the previously file version path part (if exists) and SHA256 (SHA256, secure hash algorithm-2, is a function that generates an almost-unique 256-bit signature for a text) digest of this file path part itself. The AES Key for the last part is encrypted using the user's Public Key or HSM key.

```
aesKey[0] = 0
N = object name path parts number
for (I in range(1, N))
    aesKey[I] = aesKey[I-1] XOR sha256(pathPart[I]);
    encryptedPathPart[I] = aesEncryption(pathPart [I], aesKey[I], IV=0)
encrypted Suffix = encryptWithPublicKeyOrHSMKey(aesKey[N])
```

The resulting encrypted metadata object name consists of concatenated encrypted path parts and encrypted suffix. If several users share the same file version, they will only have different suffix of the metadata object name, as they have different Public or HSM keys. The encrypted file path within metadata object name will be the same.

For example, if the user wants to list objects located in the directory "directory1/My_dir22" and use the above algorithm, the cipher text for "directory1/My_dir22" will look like "Y9FiCBJZ1zFMOj06q69S0w/Wmh7fdHMHlgtC6Nk140Tng/y3zalgv-zjmT_WyOcJj93Q", then the user can look for the encrypted names using this cipher text as a prefix and ignoring the suffix.

To decrypt a metadata object name, users use the following reversed algorithm:

```
aesKey[N] = decryptWithPrivateKeyOrHSMKey(encryptedSuffix)
N = object name path parts number
for (I in range(N, 1))
    pathPart[I] = aesDecryption(encryptedPathPart[I], aesKey[I]);
    aesKey[I-1] = aesKey[I] XOR sha256(pathPart[I])
```

Using HSM for Encryption/Decryption

AWS Key Management Service (KMS) is a managed service that makes it easy for organizations to create and control the encryption keys used to encrypt data, and uses Hardware Security Modules (HSMs) to protect the security of the keys.

Each Key in KMS has ACLs that define, which users can use it for encryption and which users for decryption.

For example, any IAM user can use the key with ID 4b54b037-c2f1-4229-87f8-bb4b97de1038 for encryption, but only bob can use it for decryption. This enables user bob to encrypt the metadata object for storage and other users to encrypt messages for bob, so only bob can decrypt them.

The other KMS key with ID 790c9f16-cd6b-4053-9f4d-350a475d113e can be used only by bob for encryption and by any other IAM user for decryption of the encrypted data. Using this key user bob can digitally sign messages or metadata objects, and other users can verify his signature.

Method

The invention is a method for key storage and exchange that together with modified Client-Side encryption approach, provides a strong solution for security on clouds and within data centers.

AWS or Azure public clouds store each file as a single cloud object and file's metadata as its properties. The invention proposes to store actual file version's content 108 as a single, or many, data objects (fragments) 102a,102b, 102c in a folder with the randomly generated name. This folder resides in a data container (or bucket, or folder) 101,111 (not shown on the diagram) specially assigned to the user, who created the file version. Data fragments are compressed (optionally) and encrypted using unique symmetric data key per file version (for example AES-256).

Figure 3:
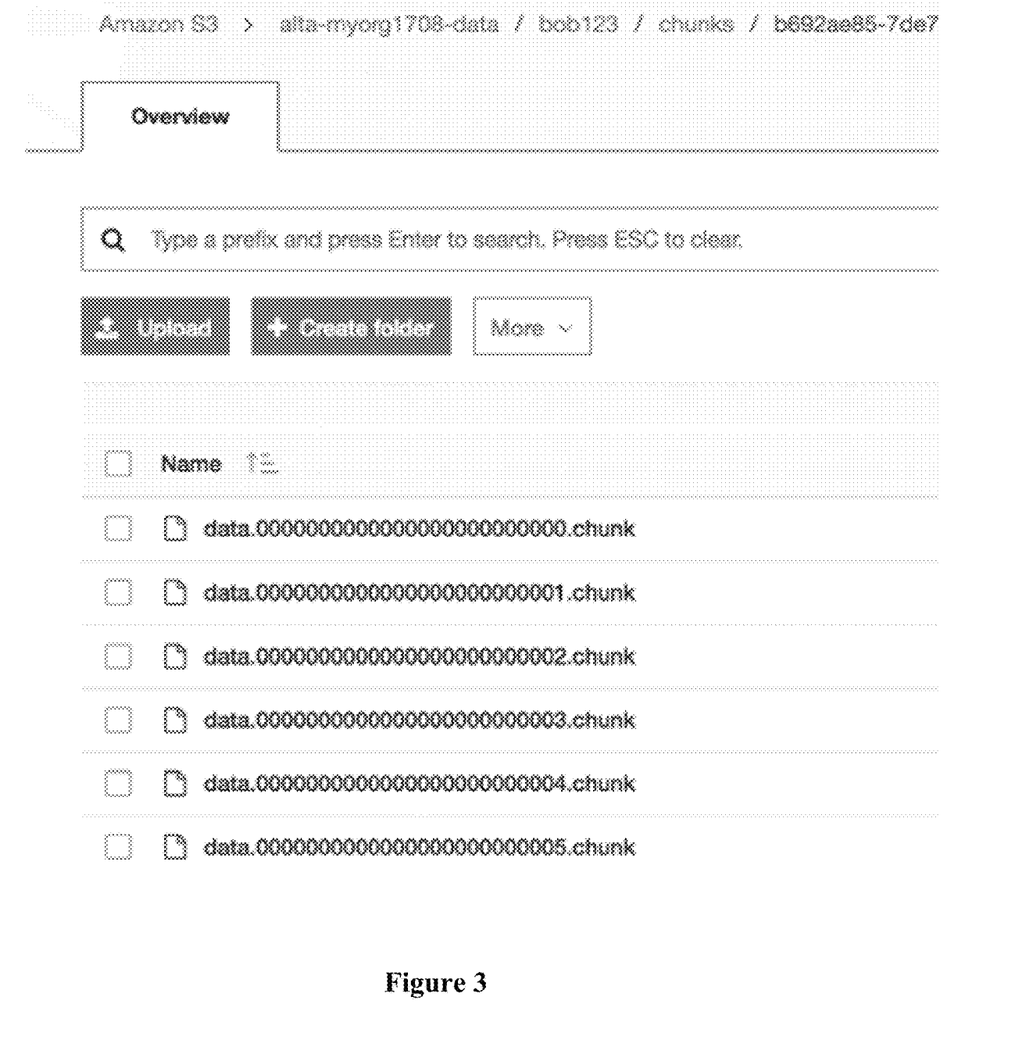
FIG. 3 is a screen shot of a directory tree.

For example, for version of the file Public/Projects/admin-SNAPSHOT-0.0.1.zip, the data container altamyorg1708-data/bob/contains fragments with names like "chunks/b692ae85-7de7-4459-a252-eb2e29966de/data.000000000000000000000000.chunk" (see FIG. 3).

Looking to FIG. 1, every user owns a catalog container with metadata objects for each file version, which the user is able to list and access. Each metadata object name includes a file path, and, optionally, tag (for example, the name of the user that created the first version of this file), file's current version (or creation time as a version). The purpose of the tag is to avoid names "collision" in case that several users independently chose the same name for the files within the folder with the same name and recovery user should keep track of both files versions. The metadata object is encrypted by a catalog owner, using his public key or hardware secure module (HSM) key. The metadata object contains, among other properties, the file version's data fragment location (that may be randomly generated name) within the data container, and the decryption data key. The metadata object is digitally signed by the catalog owner user to avoid substitution by an attacker. The metadata object name can be encrypted.

For example, for the version of the file Public/Projects/admin-SNAPSHOT-0.0.1.zip, the catalog container altamyorg1708-catalog/bob contains a metadata object with the name: "Public/Projects/admin-SNAPSHOT-0.0.1.zip/bob_1502644141030".

In some embodiments before the upload of data fragments 102a,102b,102c, metadata object 103 for the file version and data properties object, a checkpoint object is created in the catalog container. After the upload is finished, the checkpoint object will be deleted. If, for any reason, the upload was not finished, the checkpoint will be detected and deleted at some point in the future, together with the metadata object, data fragments and data properties object to clean the space. The DELETE_FILE message will be sent to all users that metadata object was shared with during the upload. The checkpoint name is the same as metadata object name with the prefix ".altastata/checkpoints/", for example ".altastata/checkpoints/Public/Projects/admin-SNAPSHOT-0.0.1.zip/bob_1502644141030".

Users have no access to other users' catalogs, however have read-only access to other user's data containers and write access to their message (changes) containers (Table 2).

TABLE 2

| Container | Owner User | Other User | Recovery User | Administrator User |
|---|---|---|---|---|
| Catalog | list, read, write, delete | none | list | list, read, write, delete |
| Data | read, write, delete | read-only | none | list, read, write, delete |
| Changes (messages) | list, read, delete | write-only | write-only | list, read, write, delete |

The user1 is able to share a metadata object copy signed by him (using, for example, Private key or HSM key) and encrypted using user 2's Public key or HSM key, by placing to the user 2's message (changes) container the object "msgqueue/00001502644149916/SHARE/bob/Public/Projects/admin-SNAPSHOT-0.0.1.zip/bob_1502644141030". The part of the metadata object name "00001502644149916" is a time of creation of the copy of the metadata object, which is used for sharing.

After discovering a new message object in the user's 2 changes container, the user 2 verifies the sender's signature, decrypts shared metadata object copy using user 2's Private key or HSM key, sings it with user's 2 Private key or HSM key, re-encrypts it with user's 2 Public key or HSM key, and copies it to user's 2 catalog as "Public/Projects/admin-SNAPSHOT-0.0.1.zip/bob_1502644141030". Each metadata object is optionally shared the same way with a special recovery user for the backup of the key, data location and data properties location. All metadata objects copies in the different users' catalog containers related to the same data have the same unique name or same unique part of their names. The message object name can be encrypted.

Algorithms

Figure 4:
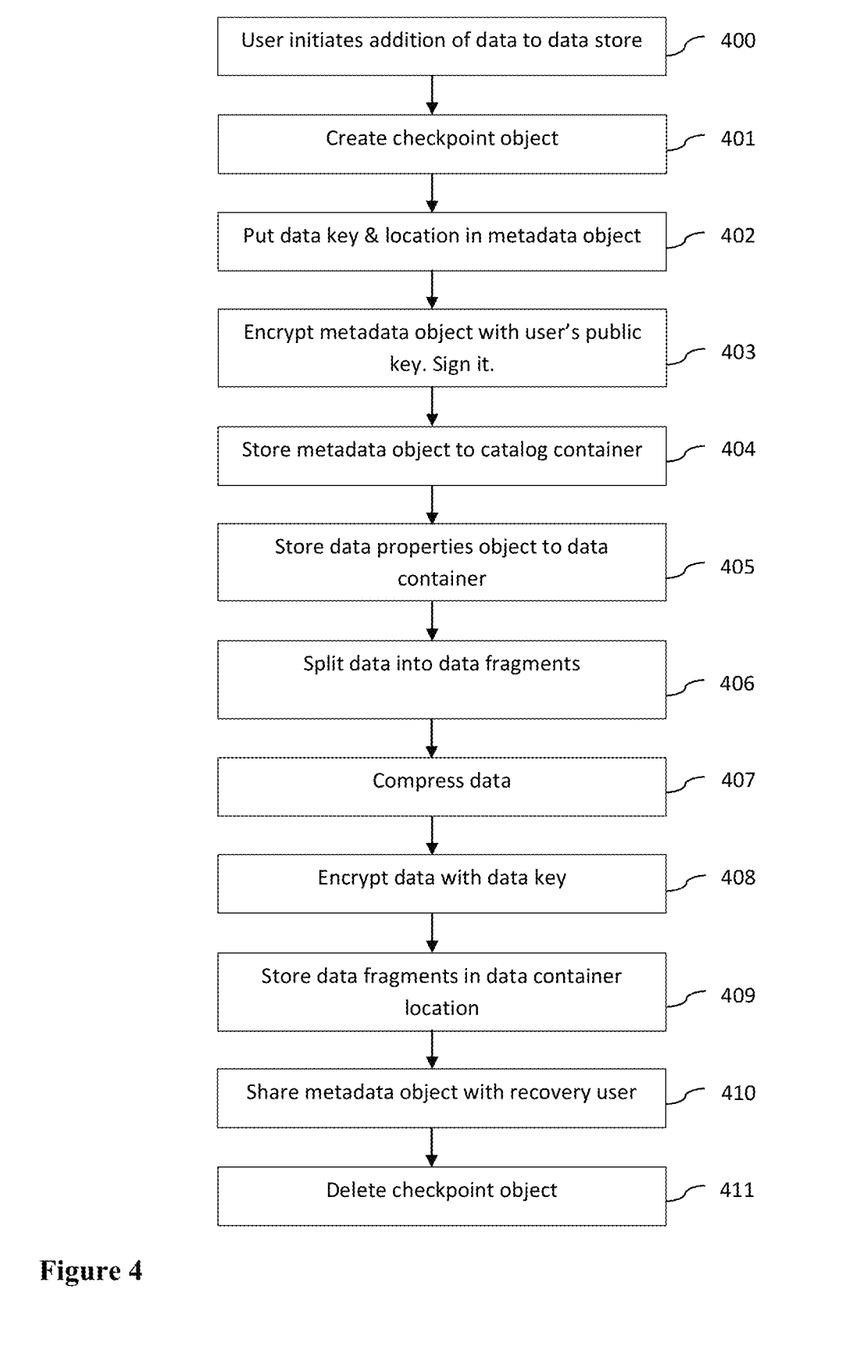
FIG. 4 is a flow chart of one embodiment for adding data to a data store.

Looking to FIG. 4, we see an algorithm for adding a data set to the data store 400. In some embodiments, a checkpoint object is created in the catalog container 401, however some embodiments will not use it. The data key is placed in a metadata object along with the location for the encrypted data and data properties object. This metadata object is stored in the user's catalog 402. In one embodiment, the catalog is specific to an individual user. In this case described here, the catalog contains the metadata object of the user's data. The catalog can also contain the metadata objects for data owned by other users. Other metadata can also be stored in the metadata object, such as modification date, version, tag, creation date, owner, archival status.

In this embodiment, the location of the data is the generated GUID, which is a part of each data fragment object name in the user's data container, while in other embodiments the location can include several locations in the different containers of different storages, file systems, storages, database tables, message bus topics, etc.

Once the user has created the metadata object, the metadata object itself is encrypted by the user, using a public key or a HSM key and signed using user's private key or HSM key 403. After that metadata object is stored 404 to the user's catalog. The organization's system administrator can list metadata objects names in users' catalog container for audit or control purposes. Organization's system administrator can see with whom users shared metadata objects. However, the system administrator is prevented from accessing the metadata objects, preventing an insider attack from the system administrator.

In some embodiments, the data properties object is created, encrypted using data key and stored 405 into user's data container, however some embodiments will not use it.

In this embodiment, the data is first chunked into data fragments 406. Optionally, the data is compressed to reduce size 407, although some embodiments will not compress the data. The data is then encrypted using a unique symmetric data key 408. The data fragments are then stored in the user's data container 409 under location specified in object metadata.

Next, the metadata object is optionally shared with the recovery user for safe keeping 410 using his message container.

Finally, the checkpoint object is deleted from the catalog container 411.

When the user seeks to access the data, the process in FIG. 4 is reversed. The user reads the metadata object in the catalog 404, decrypts it using his Private keys or HSM key and checks the signature using his Public key or HSM key 403. With the metadata object decrypted, the location of the data fragments is known, as is the data key. The data fragments are then retrieved 409 and decrypted 408 using the data key from the metadata object 402. The data is decompressed if necessary 407, and the data fragments are reassembled 406 in user's file system.

In other embodiments some or all data fragments can be decrypted 408, decompressed 407 and assembled 406 in the program memory using the same approach. In that case the program uses user's private key or HSM key to decrypt the metadata object 403.

Figure 5:
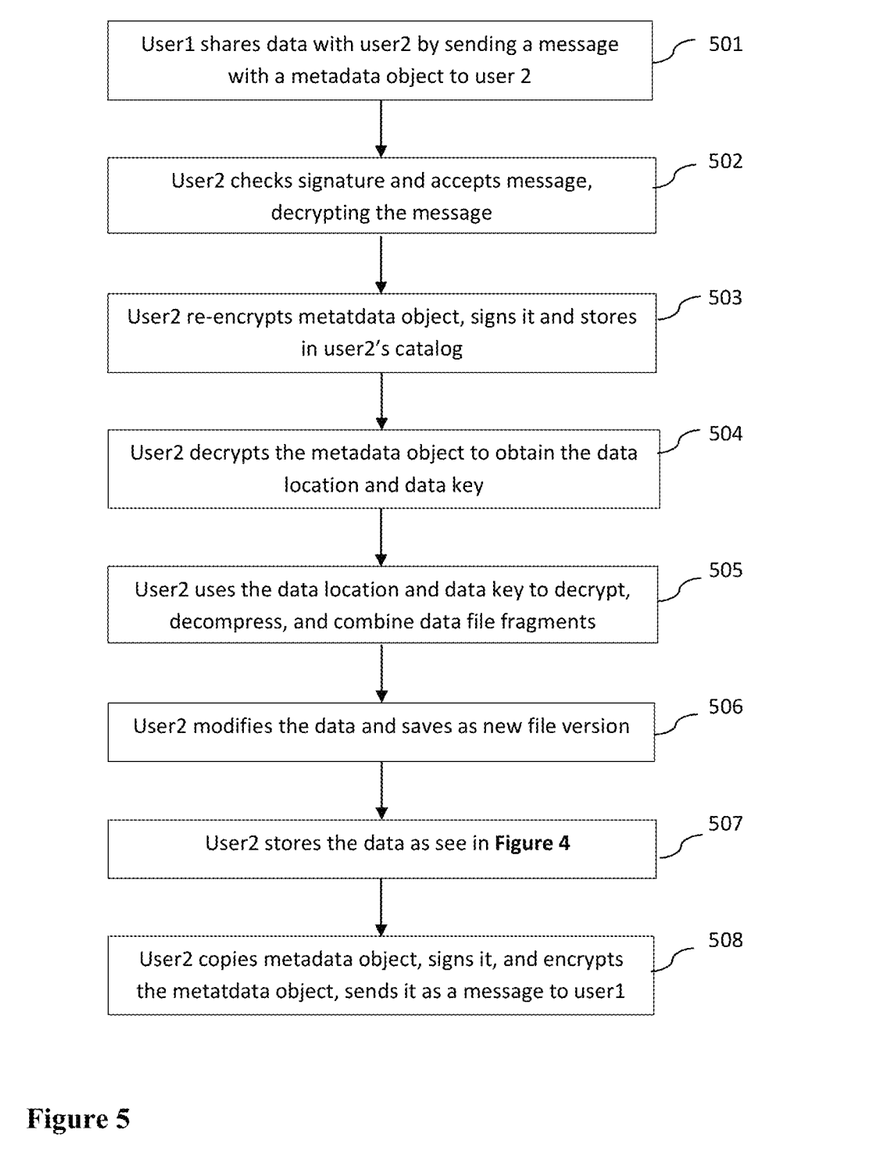
FIG. 5 is a flow chart of one embodiment of a second user modifying the data of a first data.

FIG. 5 shows one embodiment of the invention, showing how a second user (user2) can modify the data of a first user (user1). To make this modification, user1 first needs to share the data with user2 by sending a message with a copy of the metadata object that contains the data location and key. The metadata object signed by user1 and encrypted using user2's Public key or HSM key 501. User2 receives the message, decrypts it using user2's Private key or HSM key and checks the signature to be sure that the message was sent by user1 502. User2 then re-encrypts the metadata object using user2's public key or HSM key, signs it with user 2's Private key or HSM key and places the metadata object in user2's catalog 503.

User2 then decrypts the metadata object to obtain the data location and the data key 504. Next, user2 uses the data location and data key to decrypt, decompress, and combine the file version data fragments 505. User2 modifies the data, saving it as a new file version 506.

Next, user2 stores a new version of the data, using the steps outlined in FIG. 4 for new data 507. Finally, user2 copies the metadata object for the modified data file, signs the metadata object, encrypts the metadata object with user1's Public key or HSM key, and stores the metadata object as the message in user1's message container.

Hardware

Figure 7:
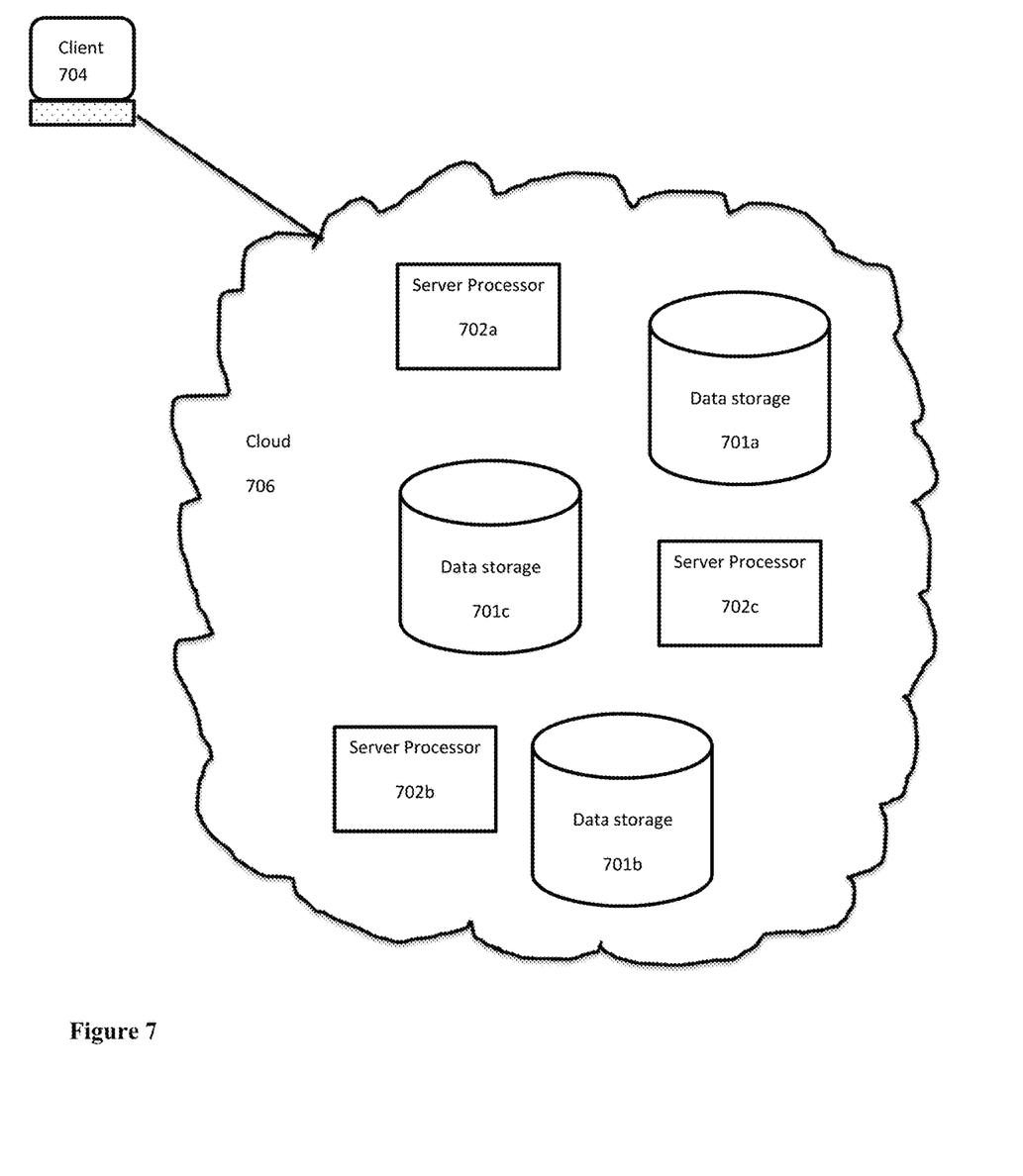
FIG. 7 is a diagram of a cloud computing embodiment.

In one embodiment, the encrypting, decrypting, compression, decompressing of the catalog and of the data is performed on a server 701a on the cloud 706. In another embodiment, the processing is performed on a number of different processors 701a,701b,701c in the cloud 706. The physical storage of the data store could be on a single server 701a or could be spread over a number of servers 701a, 701b, 701c on the cloud 706. In some embodiments, the data could be distributed over the Internet, with local copies stored on local servers, using a global network of specialized cloud servers that accelerate and secure the delivery of content, (for example Akamai servers) to store a local copy in cities near groups of users.

In another embodiment, the encrypting, decrypting, compression, decompressing of the catalog and of the data is performed on the client computer. See FIG. 6. In this embodiment, each encrypted data fragment is delivered directly to the client computer for processing.

Figure 6:
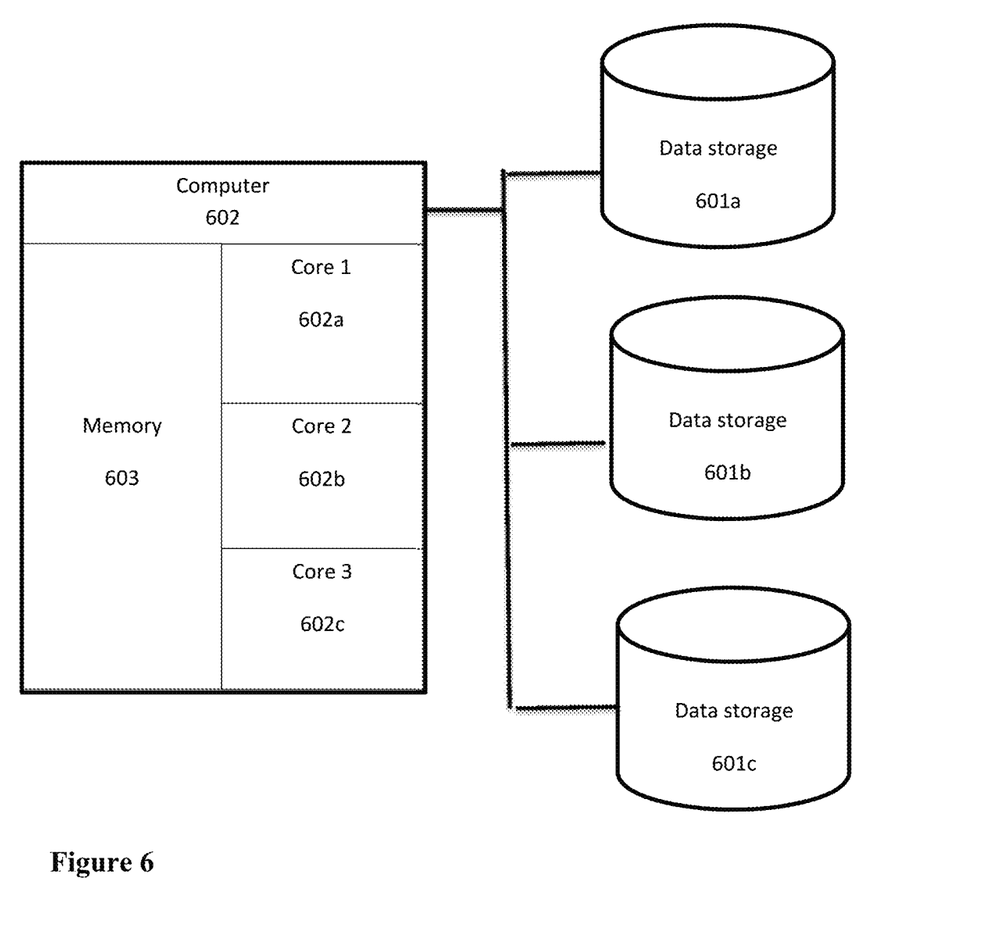
FIG. 6 is a diagram of a client computer embodiment.

In the embodiment shown in FIG. 6, there are multiple data storage devices 601a,601b,601c connected to the computer 602. These storage devices could be physical or virtual, and could be organized separately or in a RAID configuration. Some storage devices could be redundant. Storage devices could be rotating magnetic media, optical media, solid state storage devices, RAM, ROM, EEPROM, or any other storage technology.

The client computer also can be a smartphone, IoT device, robot, drone etc.

Data storage devices 601a,601b,601c are connected to or integrated into the computer 602. Computer also has memory 603 and one or more processing cores 602a,602b, 602c. The encryption, decryption, compression, decompression of the data and catalogs can be done on one processing core 602a or can be executed in parallel on multiple cores 602a,602b,602c. The data and catalogs could be stored on one data storage 601a or on multiple data storage devices 601a,601b,601c. The chunking of the data set into data fragments allows each data fragment to be assigned to a separate core (or machine, or OS thread) for encryption, decryption, compression, decompression processing.

In another embodiment, the processing of the data fragments is done on a single processor using different tasks to perform the operations, virtually in parallel. In another embodiment, the encryption, decryption, compression, decompression processing of each fragment is performed serially without any parallelism.

In one embodiment, the computer 602 is a special purpose computing device designed for parallel execution across multiple cores 602a,602b,602c. The special purpose computer facilitates the parallel encryption, decryption, compression or decompression of the encrypted data fragments.

In the embodiment shown in FIG. 7, the data and the processing are performed on the cloud. In other embodiments, the processing could be done within the client computer and the storage could be on the cloud. In another embodiment, processing is performed on the cloud and the storage is local on the client computer.

FIG. 7 shows a cloud based embodiment with a client computer 704 connected to the cloud 706 through an internet connection. The cloud 706 is an internet connected collection of storage 701a,701b,701c and processing 702a,702b, 702c resources. Data could be stored anywhere on a storage device 701a,701b,701c on the cloud. Storage could be redundant, could be stored in local cities, or in physically hardened storage facilities. The Storage could be virtually separate or seen as a single virtual data store. Processing could be done on a single processor 702a, or in parallel on multiple server processors 702a,702b,702c. Again, the chunking of the data allows each data fragment to be assigned to a separate server processor or OS thread for encryption, decryption, compression, decompression processing.

In still another embodiment, the storage and processing is done at a data center. Rather than using the Internet, the servers and storage are linked together on a local area network inside of a firewall. Access could be via a VPN or directly on the LAN.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A method of controlling access to data objects, comprising:
   a first user creating a data object in a container in a cloud or private data center object storage that has an access control list;
   the first user creating a first metadata object in the cloud or private data center object storage comprising data access information for the data object;
   the first user creating a second metadata object in the cloud or private data center object storage comprising the data access information for the data object;
   wherein a second user has access to the second metadata object;
   wherein the second user does not have access to the first metadata object;
   determining access to the data object by the data access information and the access control list,
   the first user signing the first metadata object with a first signature key;
   the first user signing the second metadata object with the first signature key;
   the second user verifying that the second metadata object is signed by the first user; and
   the second user signing the second metadata object with a second signature key.

2. The method of claim 1, wherein the data access information comprises a decryption key for the data object.

3. The method of claim 1, wherein the data access information comprises location information for the data object.

4. The method of claim 1, wherein the data access information comprises location information for a data properties object.

5. The method of claim 1, wherein the first user does not have access to the second metadata object.

6. The method of claim 1, wherein the data object is a data fragment.

7. The method of claim 1, wherein the first metadata object is decryptable with a first decryption key, wherein the first user has exclusive access to the first decryption key.

8. The method of claim 1, wherein the second metadata object is decryptable with a second decryption key, wherein the second user has exclusive access to the second decryption key.

9. The method of claim 1 further comprising
   the first user creating a recovery metadata object comprising the data access information for the data object;
   wherein a recovery user has access to the recovery metadata object; and
   blocking the recovery user from accessing the data object through the access control list.

10. A system for controlling access to data objects, comprising:
- a cloud or private data center object storage;
- a first user's computer connected to the cloud or private data center object storage;
- a second user's computer connected to the cloud or private data center object storage;
- where the cloud or private data center object storage contains:
  - a data object in a container that has an access control list, said data object owned by a first user;
  - a first metadata object comprising data access information for the data object, said first metadata object owned by the first user;
  - a second metadata comprising the data access information for the data object, created by the first user using the first user's computer;
- wherein a second user, using the second user's computer, has access to the second metadata object;
- wherein the second user does not have access to the first metadata object;
- wherein access to the data object is determined by the data access information and the access control list;
- wherein:
  - the first metadata object is signed by the first user with a first signature key;
  - the second metadata object is signed by the first user with the first signature key; and
  - the second metadata object is verified by the second user that the second metadata object is signed by the first user.

11. The system of claim 10, wherein the data access information comprises a decryption key for the data object.

12. The system of claim 10, wherein the data access information comprises location information for the data object.

13. The system of claim 10, wherein the data access information comprises location information for a data properties object.

14. The system of claim 10, wherein the first user does not have access to the second metadata object.

15. The system of claim 10, wherein the data object is a data fragment.

16. The system of claim 10, wherein the first metadata object is decryptable with a first decryption key, wherein the first user has exclusive access to the first decryption key.

17. The system of claim 10, wherein the second metadata object is decryptable with a second decryption key, wherein the second user has exclusive access to the second decryption key.

18. The system of claim 10 further comprising
- a recovery metadata object comprising the data access information for the data object, the recovery metadata object created by said first user;
- wherein a recovery user has access to the recovery metadata object; and
- the recovery user is blocked from accessing the data object through the access control list.

19. The system of claim 10 wherein the user's computer is a smartphone, a IoT device, a robot, or a drone.

* * * * *